United States Patent
Youn et al.

(10) Patent No.: US 8,068,484 B2
(45) Date of Patent: Nov. 29, 2011

(54) METHOD FOR VOID-FILLING AND TRANSMITTING BURST DATA OVER OPTICAL BURST SWITCHING NETWORK

(75) Inventors: Chun-ju Youn, Yongin-si (KR); Young-kwang Seo, Seoul (KR); Hyun-chin Kim, Seoul (KR); Keun-joo Park, Yongin-si (KR); June-koo Rhee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1739 days.

(21) Appl. No.: 11/315,005

(22) Filed: Dec. 23, 2005

(65) Prior Publication Data

US 2006/0140184 A1  Jun. 29, 2006

(30) Foreign Application Priority Data

Dec. 27, 2004  (KR) .................. 10-2004-0112977

(51) Int. Cl.
H04L 12/28  (2006.01)
(52) U.S. Cl. ............ 370/389; 370/395.4; 370/447
(58) Field of Classification Search .......... 370/389, 370/395.4, 447
See application file for complete search history.

(56) References Cited

U.S. PATENT DOCUMENTS

| | | | | |
|---|---|---|---|---|
| 6,493,120 B1* | 12/2002 | Tancevski | ................ | 398/47 |
| 6,721,315 B1* | 4/2004 | Xiong et al. | ................ | 370/389 |
| 6,898,205 B1* | 5/2005 | Chaskar et al. | ................ | 370/450 |
| 7,042,906 B2* | 5/2006 | Qiao et al. | ................ | 370/468 |
| 7,254,113 B2* | 8/2007 | Cankaya et al. | ................ | 370/235 |
| 7,257,127 B1* | 8/2007 | Cankaya | ................ | 370/459 |
| 7,298,728 B2* | 11/2007 | Golla et al. | ................ | 370/347 |
| 7,426,210 B1* | 9/2008 | Miles et al. | ................ | 370/400 |
| 2002/0154360 A1* | 10/2002 | Liu | ................ | 359/135 |
| 2004/0120320 A1* | 6/2004 | Farahmand et al. | ................ | 370/395.4 |
| 2006/0098680 A1* | 5/2006 | Kelesoglu et al. | ................ | 370/444 |

OTHER PUBLICATIONS

Xiong et al., "Control architecture in optical burst-switched WDM Networks", Oct. 2000, IEEE Journal on Selected Areas in Communications, p. 1838-1851.*
Pedro et al., "Analysis of the Processing and Sojourn Times of Burst Control Packets in Optical Burst Switches", Mar. 2008, Intl Conference on Optical Network Design and Modeling 2008, p. 1-3.*
Farahmand et al. "Supporting QoS with Look-ahead Window Contention Resolution in Optical Burst Switched Networks", GLOBECOM 2003, p. 2699-2703.*

* cited by examiner

*Primary Examiner* — Dang Ton
*Assistant Examiner* — Brian O Connor
(74) *Attorney, Agent, or Firm* — Sughrue Mion, PLLC

(57) ABSTRACT

A method for enhancing transmission efficiency of burst data by estimating a void between burst data and filling the void with new burst data in an optical burst switching (OBS) network. To this end, a node in the OBS network receives burst data (BD) aggregated from data packets, and a burst control packet (BCP) that is received prior to the BD by an offset time. The BCP contains information relating to the offset time and the BD. To predict the void between the BDs, a void filling time is defined within the offset time using the BCP. The present invention provides the method for determining whether to fill the void and filling the void by directly monitoring the BD over a preset time.

5 Claims, 6 Drawing Sheets

METHOD FOR VOID-FILLING AND TRANSMITTING BURST DATA OVER OPTICAL BURST SWITCHING NETWORK

CROSS-REFERENCE TO RELATED APPLICATIONS

This application claims the benefit under 35 U.S.C. §119 (a) from Korean Patent Application No. 2004-112977 filed on Dec. 27, 2004 in the Korean Intellectual Property Office, the entire disclosure of which is incorporated herein by reference.

BACKGROUND OF THE INVENTION

1. Field of the Invention

The present invention relates to a method for transmitting optical burst data by inserting new burst data into a void between the optical burst data on a channel so as to reduce errors of the optical burst data and improve availability of the channel over an optical burst switching (OBS) network.

2. Description of the Related Art

Over optical burst switching (OBS) networks, typically, IP packets coming into an optical domain are aggregated to burst data at an edge node, and such burst data is routed to their destination nodes via a core node according to their destinations or quality of service (QoS). A burst control packet (BCP) and a payload (burst data:BD) are separated by an offset time and transmitted on different channels. In more detail, the BCP precedes the burst data by the offset time to reserve in advance a path for the transmission of the burst data. Accordingly, the burst data can be transmitted over the optical network without buffering. Hereafter, the transmission of the optical data is explained in reference to FIG. 1.

FIG. 1 illustrates nodes that transmit and receive or switch the burst data over the OBS network, which is described in detail.

As for incoming IP packets, the node A 100, which is an edge node, generates burst data by aggregating the IP packets. Edge nodes 100, 106, and 108 serve to generate and transmit optical burst data packets by aggregating IP packets, or receive the optical burst data packets and divides them into IP packets. Core nodes 102 and 104 are responsible to optically switch the optical burst data. Upon generating the burst data in a desired size, the node A 100 generates and transmits a burst control packet (BCP) to the node B 102 which is the core node. After the offset time, the node A 100 transmits the burst data to the node B 102. The BCP contains information relating to a destination address and a source address of the burst data, a size of the burst data, and the offset time.

The node B 102 checks the destination address of the burst data to be received from the received BCP, determines an optical path, and reserves a time for the optical switching. While the BCP is converted optic-electronically or electro-optically at the node B 102, the burst data follows the optical path only by the optical switching, without the optic-electronic conversion. The node B 102 can optically switch the burst data to the node D 106 or the node C 104 depending on whether the destination of the burst data provided from the node A 100 is either the node D 106 or the node E 108.

It has been described that the node B 102 relays the burst data from the node A 100 to either the node D 106 or the node E 108. Meanwhile, the node B 102 may be the destination of the burst data originated from the node A 100 or may generate burst data to be transmitted to the node D 106 or the node E 108. In other words, the node B 102 being the core node can function as the edge node. In this case, a method is demanded for the node B 102 to relay the burst data received from the node A 100 to the node D 106 or the node E 108 on one channel by inserting its generated burst data between the received burst data so as to save resources.

FIG. 2 illustrates transmission of the BCP and the burst data over a conventional OBS network. Descriptions are provided of a problem occurring when the void between burst data is filled with other burst data on a conventional channel in reference to FIG. 2.

Referring to FIG. 2, the BCP is transmitted and received on a channel $\lambda_{BCP}$, and the burst data BD is transmitted and received on a channel $\lambda_{BD}$. As mentioned earlier, the BCP contains information relating to the offset time and the BD size. The offset time is a temporal difference between the receiving time point of the BCP and the receiving time point of the BD.

In FIG. 2, the offset time between the BCP1 and the BD1 is T_offset1, and the offset time between the BCP2 and the BD2 is T_offset2. The channel $\lambda_{BD}$ is not filled with the burst data all the time, but a non-transmission time period without data signals is present between the burst data, which is called a void time T_void.

A node performs the optic-electronic conversion and electrical processing to the received BCPs. As for the BDs, the node conducts switching or add/drop function. The node may have data ready to be transmitted on the same channel as the channel of the BD1 and the BD2. In FIG. 2, it is exemplified that the node transmits the BD3 on the same channel as the BD1 and the BD2. The node serves as the core node with respect to the BD1 and the BD2. Yet, the node serves as the edge node for the BD3. When the BCP3 and the BD3, which are locally generated without the offset time, are transmitted from the node, the BCP3 precedes the BD3 by the offset time T_offset3. In case that the BCP3 and the BD3 are transmitted from another node, rather than generated locally, the BCP3 and the BD3 are received at the node with the offset time defined from the very first.

However, a general node in the OBS network cannot learn the size of the time interval T_void between the BD1 and the BD2 until the BCP2 is input. In this regard, when T_void is longer than the BD3 regardless of the input of the BCP2, a method is demanded to fill the time interval between the BCP1 and the BD1 with the BCP3 and the BD3, respectively, without collisions with other BDs.

SUMMARY OF THE INVENTION

The present invention has been provided to solve the above-mentioned and other problems and disadvantages occurring in the conventional arrangement, and an aspect of the present invention provides a method for enhancing a transmission efficiency of burst data by predicting T_void between the burst data and filling the void between the burst data with new burst data in an optical burst switching or optical burst add/drop network.

Another aspect of the present invention provides a method for filling voids between burst data with new burst data without incurring collisions by predicting T_void between the burst data in an optical burst switching or optical burst add/drop network.

To achieve the above aspects and/or features of the present invention, a method for transmitting a burst control packet (BCP) that contains time offset information of burst data (BD) to be received by a node in an optical burst switching (OBS) network, and transmitting the BD that is received at an interval of the offset time from the BCP, includes predefining a void filling time within the offset time, the void filling time to be filled with new BD; determining whether second BCP is received within the void filling time based on received first BCP; inserting third BD to be transmitted when the second BCP is not received within the void filling time; and transmitting the first BD by delaying the first BD as long as the void filling time.

In accordance with the above aspects of the present invention, a method for transmitting a burst control packet (BCP) that contains time offset information of burst data (BD) to be received by a node in an optical burst switching (OBS) network, and transmitting the BD that is received at an interval of the offset time from the BCP, includes checking whether second BD is received within a predefined void filling time after the reception of the first BD; and transmitting third BD after the first BD in succession. The third BD is transmitted with a predefined offset time maintained from third BCP corresponding to the third BD.

Additional and/or other aspects and advantages of the invention will be set forth in part in the description which follows and, in part, will be obvious from the description, or may be learned by practice of the invention.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF EXEMPLARY EMBODIMENTS

Figure 1:
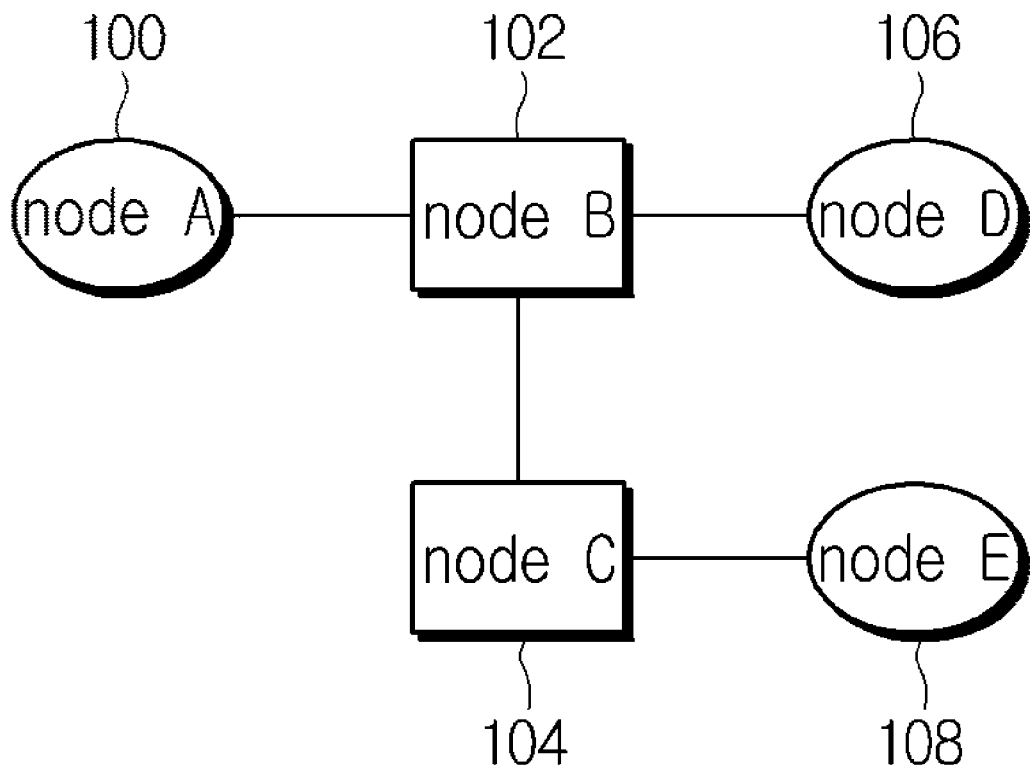
FIG. 1 illustrates an optical burst switching (OBS) network constructed with a plurality of nodes.
Figure 2:
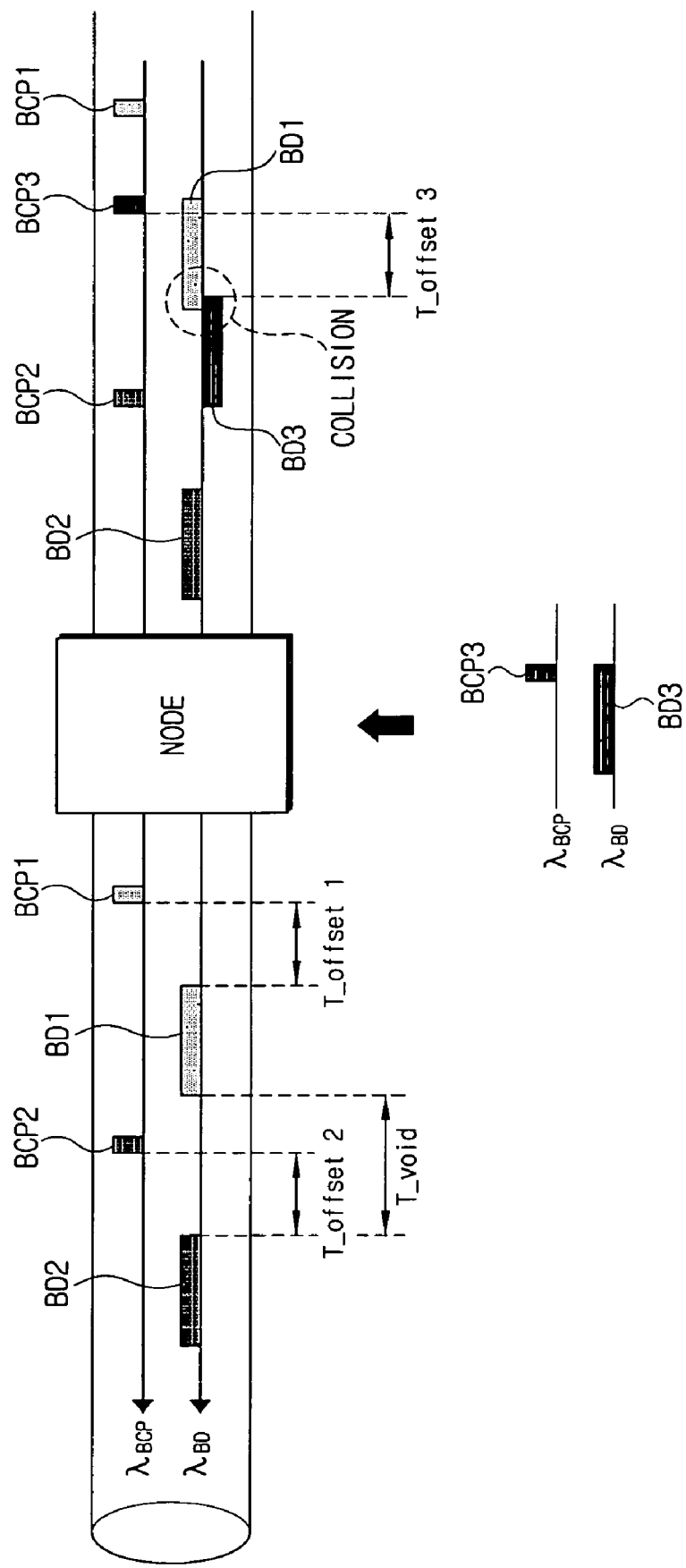
FIG. 2 illustrates insertion and transmission of burst data at a core node in a conventional OBS network.

Reference will now be made in detail to the exemplary embodiments of the present invention, examples of which are illustrated in the accompanying drawings, wherein like reference numerals refer to the like elements throughout. The embodiments are described below to explain the present invention by referring to the figures.

Hereinafter, descriptions are made in reference to attached drawings on a method for filling voids between burst data (BD) with new BD in an optical network according to embodiments of the present invention.

First Embodiment

According to a first exemplary embodiment of the present invention, a void filling method using a offset time is suggested, which is now set forth in detail in reference to FIGS. 3A-3C and FIG. 4.

According to the first embodiment of the present invention, a void filling time is defined as a threshold within an offset time. The offset time includes the void filling time in addition to its primary time required to process a burst control packet (BCP) received at a destination node. The offset time can be calculated from Equation 1.

new offset time=void filling time+processing time+ extra time [Equation 1]

The void filling time is a time required to fill T_void with new burst data. The void filling time needs to be longer than a maximum time period of the burst data to fill with. When minimum and maximum sizes of the burst data are determined in an optical network, the void filling time is set to be longer than the maximum burst data size so as to fill voids between burst data with new burst data without incurring collisions. In other words, to fill the voids between the burst data with the new burst data, the void T_void between the burst data has to be longer than the void filling time and the void filling time has to be longer than the size of the new burst data.

Figure 3A:
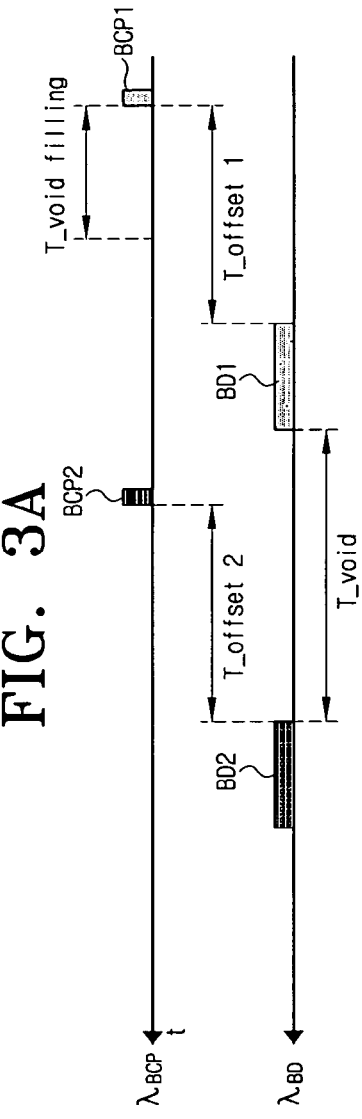
FIGS. 3A through 3C illustrate insertion and transmission of burst data at core node of an OBS network according to a first embodiment of the present invention.
Figure 3B:
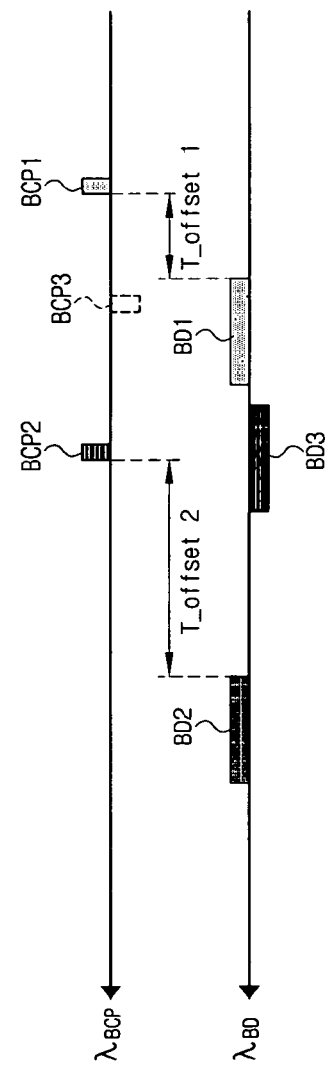
Figure 3C:
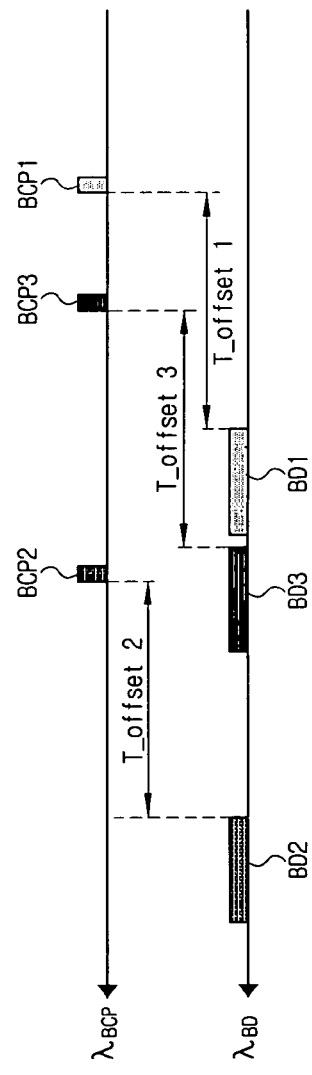

The first embodiment of the present invention is described in reference to FIGS. 3A-3C. FIG. 3A illustrates BCPs and BDs transmitted to a node, FIG. 3B illustrates processing of the BCPs and the BDs received at the node, and FIG. 3C illustrates BCPs and BDs output from the node.

Referring first to FIG. 3A, the node receives the BCP1 and the BCP2 on a channel $\lambda_{BCP}$, and receives the BD1 and the BD2 on a channel $\lambda_{BD}$. The BCP1 and the BD1 have an offset time T_offset1 therebetween, and the BCP2 and the BD2 have an offset time T_offset2 therebetween. The BD1 and the BD2 are transmitted to the node with T_void maintained. However, as set forth earlier, the node cannot estimate T_void until receiving the BCP2.

Referring to FIG. 3B, after waiting for the void filling time 'T_void filling', the node receives BCP1. Since the void filling time is included in the offset time, the offset time between the BCP1 and the BD1 reduces.

A determination is made on whether a new BCP is received within the void filling time. As aforementioned, it is required that the void filling time be longer than the maximum size of the burst data to fill with so as to insert the burst data even with the maximum size. In case that the burst data is inserted when a new BCP, that is, BCP2 is received within the void filling time, blocking (collision) occurs. In this situation, the node cannot transmit its new burst data on the channel $\lambda_{BD}$. Conversely, when a new BCP is not received within the void filling time, the node can transmit its new burst data on the channel $\lambda_{BD}$. In FIG. 3B, as a new BCP is not received after the BCP1 receiving time point and the void filling time, the node determines to transmit the BD3 on the channel $\lambda_{BD}$. The determination to insert the BD3 on the channel $\lambda_{BD}$ can be made after the elapse of the void filling time, but the reservation of the BD3 is conducted substantially after the BD1. The reservation of the BCP3 is made in advance by a time calculated by subtracting the void filling time from the offset time.

FIG. 3C exemplifies that the node outputs the BD3 on the channel $\lambda_{BD}$ in addition to the BD1 and the BD2. As shown in FIG. 3C, the offset time is recovered to an original offset time before inputting to the node. The recovery of the offset time can be achieved by delaying the BD as long as the void filling time when the BD departs the node. In FIG. 3C, it can be seen that the offset time between BCP1 and the BD1 recovers its original offset time before inputting to the node as T_offset1, and that the offset time between the BCP3 and the BD3 is transmitted as T_offset3.

It has been exemplified that the new BD is generated and reserved together with the new BCP when the new BD is inserted. It should be appreciated that appropriate time can be reserved for the new BD and the new BCP in the same manner as set forth above even when the new BD and the new BCP are input with the offset time defined.

Figure 4:
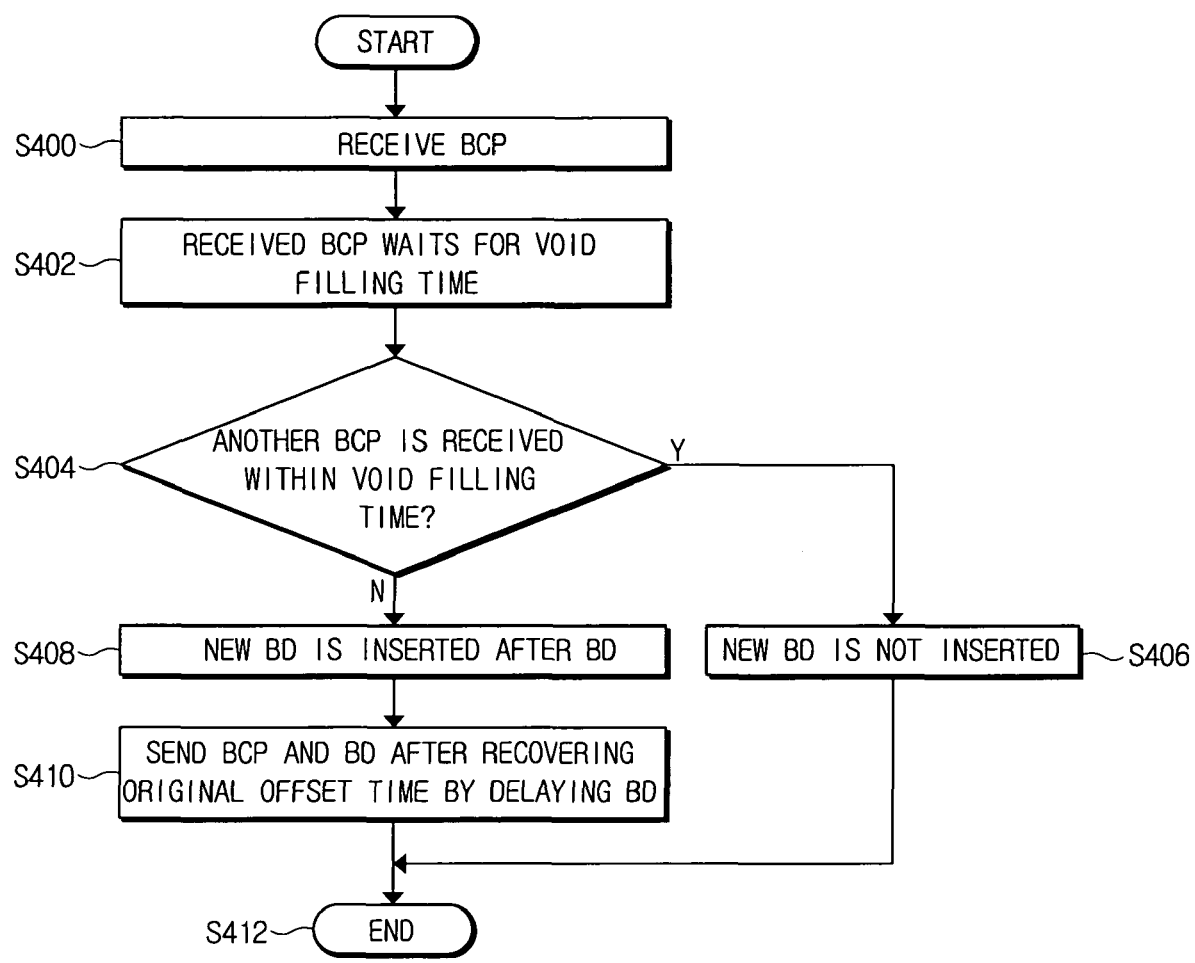
FIG. 4 is a flowchart outlining the insertion and transmission of the burst data at the core node in the OBS network according to the first embodiment of the present invention.

FIG. 4 illustrates an operation of the node according to the first embodiment of the present invention, to be explained.

The node receives the BCP1 (S400). The BCP1 waits for a predefined void filling time (S402).

The node checks whether another BCP (BCP2) is received within the void filling time after the receiving time point of the BCP1 (S404).

When another BCP (BCP2) is received within the void filling time, the node proceeds to operation S406. Otherwise, the node proceeds to operation S408.

If BCP2 is received within the void filling time, the node cannot add the new BD3 and the new BCP3 (S406), but only transmits the received BCP1, BCP2, BD1, and BD2.

When BCP2 is not received within the void filling time, the node can insert the BD3 after the BD1 (S408). In addition, the node can insert the BCP3 after the BCP1. That is, the node makes reservations in order of the BD1 and the BD3. Note that the BCP1 and the BCP3 precede their corresponding BDs by the offset time from which the void filling time is subtracted.

The node sends the BCPs and the BDs by restoring their offset times to the original offset times before inputting the node (S410). This can be achieved by delaying the offset times as long as the void filling time by use of an optical delay line (ODL) or an optical delay buffer with respect to the channel $\lambda_{BD}$.

Second Embodiment

According to a second embodiment of the present invention, the void is filled with the received BDs, rather than with the offset time and the BCPs as in the first embodiment of the present invention. Herebelow, the second embodiment of the present invention is described in detail in reference to FIG. 5 and FIG. 6.

Figure 5:
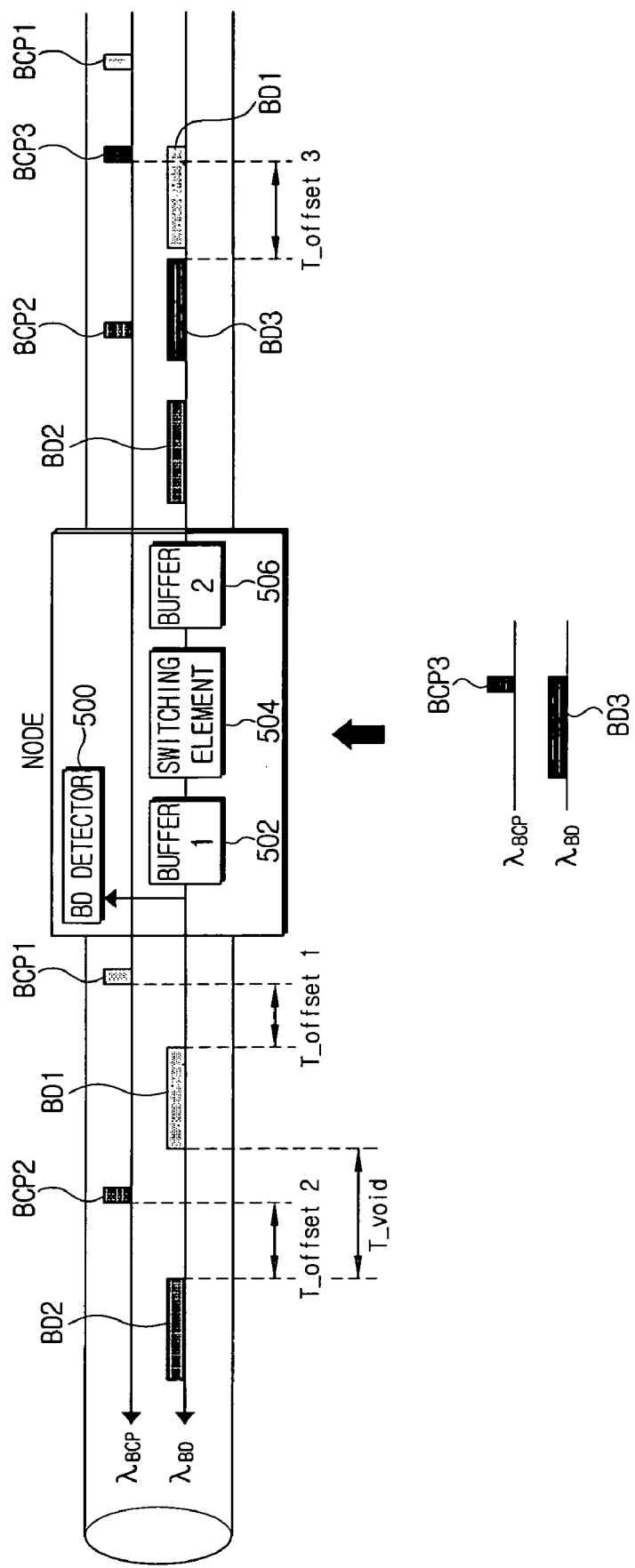
FIG. 5 illustrates insertion and transmission of burst data at core node of an OBS network according to a second embodiment of the present invention.

FIG. 5 depicts BCPs and BDs transmitted and received at a node according to the second embodiment of the present invention. The node receives the BCPs on a channel $\lambda_{BCP}$, and receives the BDs on a channel $\lambda_{BD}$. As set forth above, the BCP contains information pertaining to the offset time between the BCP and the BD, and the BD size. As shown in FIG. 5, the node receives BCP1 and BCP2 on the channel $\lambda_{BCP}$, and receives BD1 and BD2 on the channel $\lambda_{BD}$. The offset time between the BCP1 and the BD1 is T_offset1, and the offset time between the BCP2 and the BD2 is T_offset2.

It has been explained that the channel $\lambda_{BD}$ does not carry the BD all the time, but is divided into a transmission time period in which the BD is delivered and a non-transmission time period in which the BD is not delivered. In FIG. 5, the non-transmission time period is the interval between the transmission time period of the BD1 and the transmission time period of the BD2, and represented as T_void.

Referring to FIG. 5, a BD detector 500 of the node determines whether the BD is received on the channel $\lambda_{BD}$. A first buffer 502 delays the received BD for filling a new BD when the BD detector 500 detects the received BD. In specific, the BD detector 500 monitors whether next BD is received within a void filling time which is predefined from the end point of the BD. If the next BD is not received, it is feasible to insert new BD after the existing BD. If the next BD is received, the node cannot insert new BD after the existing BD. Thus, the first buffer 502 is an optical delay element corresponding to the void filling time and needs to be greater than the maximum BD size, similarly to the first embodiment of the present invention.

A switching element 504 switches or add/drops the transmitted BDs according to their destinations. In specific, when the node is not the destination of the BD, the switching element 504 switches the BD. When the node is the destination of the BD, the switching element 504 performs the drop function. Additionally, the switching element 504 performs the add function to insert new BD.

A second buffer 506 is an optical delay of the BD for providing the offset time between the BCP and the BD even when the BCP and the BC are received at the same time.

FIG. 5 illustrates a case when the BD2 is not received within the void filling time. Hence, the node transmits the BD3 using the interval between the BD1 and the BD2. When the BCP3 and the BD3 are output from the node, T_offset3 is defined between the BCP3 and the BD3 by means of the second buffer 506.

Figure 6:
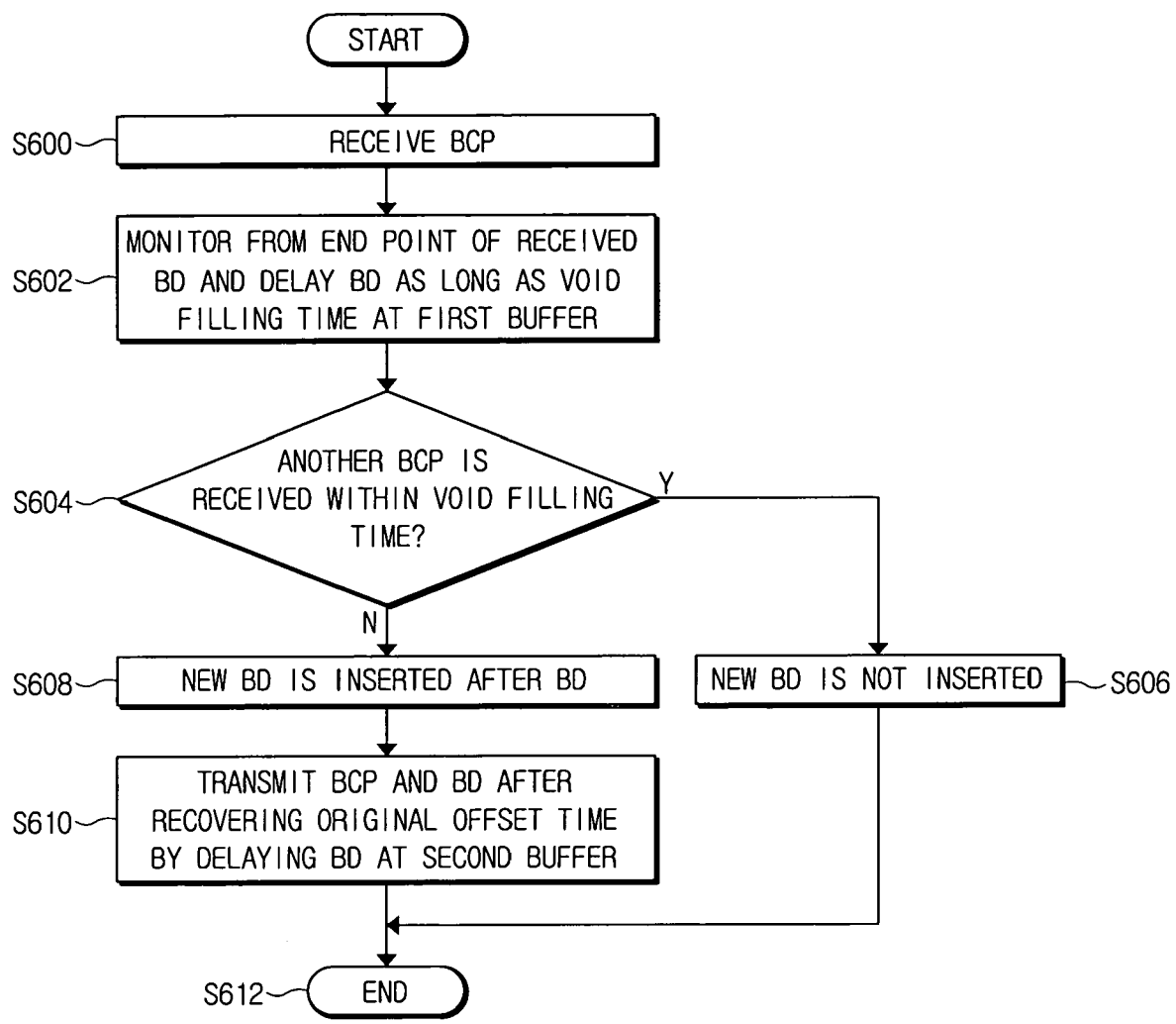
FIG. 6 is a flowchart outlining the insertion and transmission of the burst data at the core node in the OBS network according to the second embodiment of the present invention

FIG. 6 is a flowchart outlining the operation of the node according to the second embodiment of the present invention, to be explained below.

The node receives the BD1 (S600). The BD detector monitors whether next BD is received within the void filling time that is predefined from the end point of the BD1, and the BD1 is delayed at the first buffer (S602).

The BD detector checks whether another BD (BD2) is received within the void filling time after the end point of the BD1 (S604).

When another BD (BD2) is received within the void filling time, the node proceeds to operation S606. When another BD (BD2) is not received within the void filling time, the node proceeds to operation S608.

If BD2 is received within the void filling time, the node cannot insert the new BD3 and the new BCP3 but transmits only the received BCP1, BCP2, BD1, and BD2 (S606).

If BD2 is not received within the void filling time, the node inserts the BD3 after the BD1 and the BCP3 after the BCP1 (S608). That is, the node makes reservations in order of the BD1 and the BD3.

As transmitting the BCPs and the BDs, the node recovers the original offset times that are defined before inputting to the node (S610). This can be achieved by delaying as long as the offset time on the channel $\lambda_{BD}$ by means of an optical delay line or the second buffer.

In light of the foregoing as set forth above, the transmission efficiency can be improved because the node fills the non-transmission period between the BDs with the new BD in the optical communication network. Furthermore, the estimation of the non-transmission period between the BDs can avoid the collisions that may occur when the new BDs are inserted.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for transmitting a burst data (BD) received at an interval of an offset time from a burst control packet (BCP) containing information pertaining to the offset time of the BD by a node in an optical burst switching (OBS) network, the method being performed by the node and comprising:

defining a void filling time within the offset time, wherein the void filling time is at least long enough to fill a new BD between a first in time BD and a second in time BD, and the new BD is generated by the node;

determining whether a second in time BCP corresponding to the second in time BD is received within the void filling time after the reception of a first in time BCP corresponding to the first in time BD; and transmitting the new BD after transmitting the first in time BD by delaying the first in time BD as long as the void filling time if it is determined that the second in time BCP is not received within the void filling time, wherein the offset time is a temporal difference between a receiving time point of the BCP and a receiving time point of the BD.

2. The method according to claim 1, wherein the void filling time is longer than a maximum size of the new BD to be filled.

3. The method according to claim 1, wherein the BDs and the BCPs are transmitted on different channels.

4. The method according to claim 1, wherein at least one new BD is filled between the first in time BD and the second in time BD depending on a size of the void filling time.

5. The method according to claim 1, wherein a new BCP corresponding to the new BD is transmitted prior to the new BD.

* * * * *